United States Patent Office 3,141,498
Patented July 21, 1964

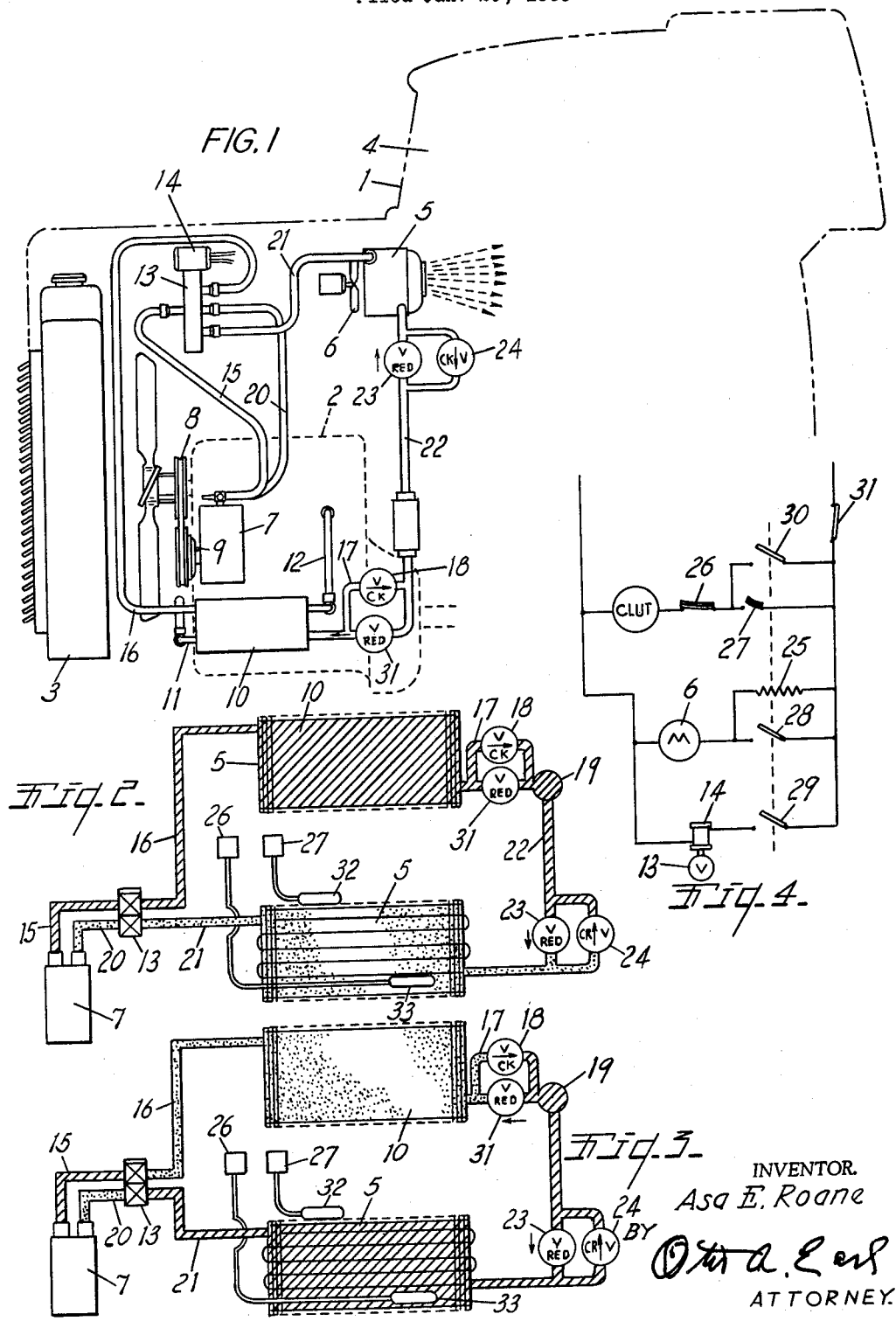

3,141,498
AUTOMOTIVE HEATING AND COOLING SYSTEM
Asa E. Roane, Cadillac, Mich., assignor to Kysor
Industrial Corporation, Cadillac, Mich.
Filed Jan. 25, 1963, Ser. No. 253,919
8 Claims. (Cl. 165—43)

This invention relates to improvements in automotive heating and cooling system. The principal objects of this invention are:

First, to provide a reversible heat pump for installation in automobiles and trucks that will alternatively transfer heat from the engine cooling system to the interior of the vehicle or from the interior of the vehicle to the engine cooling system to cool the interior of the vehicle.

Second, to provide an automotive air conditioning system having vehicle cooling capabilities that can also be used to start heating the interior of the vehicle immediately upon starting the engine on cold days and automatically increase its heating capacity as the engine warms up.

Third, to provide a reversible heat pump for automotive vehicles having a minimum number of parts for economical manufacture and maintenance.

Other objects and advantages of the invention will be apparent from a consideration of the following description and claims. The drawings, of which there is one sheet, illustrate a highly practical form of the application.

FIG. 1 is a fragmentary, side elevational view of the air conditioning system of the invention installed in an automotive vehicle, parts of the vehicle cab and engine being shown in phantom outline.

FIG. 2 is a schematic circuit diagram of the refrigerant circuit shown in car cooling condition.

FIG. 3 is a schematic circuit diagram of the refrigerant circuit shown in car heating condition.

FIG. 4 is a schematic wiring diagram of the electrical controls of the system.

In the drawings, 1 indicates the body of a truck or automobile having a liquid cooled engine 2 with radiator 3. The passenger compartment 4 is adapted to be heated or cooled by air blown over the heat exchanger coil 5 by the motor driven fan 6. A refrigerant compressor 7 is driven from the engine 2 by the belt 8 through a magnetic clutch 9. Liquid to gas heat exchanger 10 receives hot coolant from the engine through the conduit 11 and returns the coolant to the engine through the conduit 12 after having either added heat to or abstracted heat from refrigerant in the air conditioning system depending upon the setting of the controls of the system.

The refrigerant system includes the previously identified compressor 7, liquid to gas heat exchanger 10, refrigerant to air heat exchanger 5 and connections and controls to be explained. A four way valve 13 actuated by energized and de-energized conditions of a solenoid 14 regulates the flow of refrigerant to and from the compressor. The refrigerant in the system is a relatively low pressure refrigerant. That is, at an elevated temperature of 200° F. it would be gaseous at a pressure of around 87 pounds per square inch and can be liquified at higher pressures or lower temperatures. Freon 11 is a refrigerant of this type.

When the system is set to cool the passenger compartment as shown in FIGS. 2 and 4 the valve 13 is in de-energized condition and connects the output or high pressure conduit 15 of the compressor to the conduit 16 to the liquid heat exchanger 10 where heat from the compressed gas is transferred to the relatively cool (180°) engine coolant. The refrigerant under high pressure is liquified and passes through the by-pass 17 and one way check valve 18 to the receiver and dryer tank 19. The four way valve 13 connects the suction line 20 of the compressor to the conduit 21 connected to the air heat exchanger 5 in the passenger compartment so that the suction draws liquified refrigerant through the conduit 22 and expansion valve 23 into the heat exchanger where the refrigerant expands, cools and absorbs heat from the air in a familiar manner to cool the air and the passenger compartment. Flow of refrigerant around the expansion valve is prevented by the one way check valve 24. The motor of fan 6 is energized at reduced speed through the resistor 25. The thermostatic switch 26 which closes below a high temperature for example 210° F. in the heat exchanger 5 will be closed and the thermostatic switch 27 which opens below a given low temperature, say 30° F. is shown open indicating that sufficient cooling capacity is available and de-energizing the clutch 9 and the compressor 10. As the supply of liquid refrigerant decreases and the back pressure and temperature of the exchanger 5 rise indicating the need for more cooling, the switch 27 closes and activates the compressor.

When the system is conditioned as a heating system for the compartment 4, the ganged switches 28 and 29 are closed. Switch 28 by-passes the resistor 25 to run the motor 6 at higher speed and switch 29 energized the solenoid 14 to shift the valve 13 so that the circulation in the refrigerant system is as shown in FIG. 3. Switch 30 ganged with the other control switches by-passes low temperature switch 27 so that regardless of cold weather and low temperature, the compressor will start to compress hot gas into the air heat exchanger 5 where it gives up heat to the interior of the vehicle. The suction line 20 then draws gas through the by-pass check valve 24 to the receiver 19 from where it is expanded and cooled through the expansion valve 31 to the liquid heat exchanger and functions to assist in cooling the engine coolant.

Even though the engine coolant may be cold, as when starting the engine on a cold morning, the coolant contains some heat that is given up to the low pressure gas which is then returned to the compressor through the suction line 20 where it is recompressed to provide immediate heat to the passenger compartment. As the engine and its coolant heat up, more and more heat is available at the heat exchanger 10 to increase the efficiency of the heat pump and the temperature of the gas delivered by the compressor. When the temperature of the air heat exchanger 5 reaches the high limit such as 210° F. as determined by the switch 26, the compressor is deactivated.

Switch 31 deactivates the entire system. Temperature sensing bulb 32 at the outlet end of exchanger 5 when under suction pressure controls and actuates the low temperature switch 27. Bulb 33 at the other or high temperature outlet end of the exchanger actuates and controls switch 26.

The refrigerant charge used in the system is important to the efficiency of the system. The Freon 11 refrigerant mentioned is a trade name or brand of trichloromonofluoromethane. Other similar refrigerants could be used and generally considered should be low pressure, stable refrigerants having a high specific heat. For the purposes of definition in this disclosure and the claims, a stable gas is one which will decompose less than .04% at 300° F. A low pressure gas is defined as one which remains a liquid between 40 pounds per square inch to a ten inch of vacuum at 40° F. The pressure should not exceed 500 pounds per square inch at 200° F. The settings of the thermostatic switches 26 and 27 may be varied to suit the desires of the customers. For example the switch 26 could be set to permit the compressor to continue to operate up to temperatures as high as 250° F. in the coil 5. It is not practical to have the switch 27 remain closed at much less than 30° F. as this creates excessive icing of the coil and inefficiency during humid weather.

What is claimed as new is:

1. A reversible air conditioning system in an automotive vehicle having a passenger chamber and a liquid cooled engine comprising,
   a first heat exchanger means including a coil having fan means for circulating air in said chamber over the coil,
   a second heat exchanger means including a coil arranged to have coolant liquid from said engine circulated thereover,
   a compressor,
   means including an electrically actuated magnetic clutch arranged to drivingly connect said engine to said compressor,
   means including an electrically controlled four-way valve connected to said compressor and arranged when energized to selectively connect the output pressure side of the compressor to said second heat exchanger coil and the inlet suction side of the compressor to the first of said heat exchanger coils while selectively oppositely connecting the compressor to said heat exchanger coils in the opposite deenergized position of the valve,
   a refrigerant receiver connected between the opposite sides of said heat exchanger coils from said valve,
   means including a pair of pressure reducing valves connected in series one on each side of said receiver and arranged to reduce the pressure of refrigerant passing from said receiver to said heat exchanger coils.
   means including oppositely opening check valves bypassing said pressure reducing valves and opening from the low pressure side to the high pressure side of the reducing valves,
   a main electrical circuit connectable to engage said clutch, said fan means and said valve control,
   a low temperature thermostatic switch and a high temperature thermostatic switch connected in series with said clutch across said circuit to control the operation of said clutch,
   a manually operative switch bridged across said low temperature thermostatic switch,
   a fan energizing circuit including said fan means and a series resistor connected across said main circuit,
   a second manual switch ganged with said first manual switch and bridging said resistor,
   and a third manual switch connected in series with said valve means across said main circuit to control said valve and engaged with said first manual switch,
   said refrigerant system being filled with a low pressure refrigerant,
   said thermostatic switches being actuated in response to temperature at the ends of said first heat exchanger coil.

2. A reversible air conditioning system in an automotive vehicle having a passenger chamber and a liquid cooled engine comprising,
   a first heat exchanger means including a coil having fan means for circulating air in said chamber over the coil,
   a second heat exchanger means including a coil arranged to have coolant liquid from said engine circulated thereover,
   a compressor,
   means including an electrically actuated clutch arranged to drivingly connect said engine to said compressor,
   means including an electrically controlled four-way valve connected to said compressor and arranged to selectively connect the output pressure side of the compressor to said second heat exchanger coil and the inlet suction side of the compressor to the first of said heat exchanger coils while selectively oppositely connecting the compressor to said heat exchanger coils in the opposite position of the valve,
   a refrigerant receiver connected between the opposite sides of said heat exchanger coils from said valve,
   means including a pair of pressure reducing valves connected in series one on each side of said receiver and arranged to reduce the pressure of refrigerant passing from said receiver to said heat exchanger coils,
   means including oppositely opening check valves bypassing said pressure reducing valves and opening from the low pressure side to the high pressure side of the reducing valves,
   a main electrical circuit connectable to engage said clutch, said fan means and said valve control,
   a low temperature thermostatic switch and a high temperature thermostatic switch connected in series with said clutch across said circuit to control the operation of said clutch,
   a manually operative switch bridged across said low temperature thermostatic switch,
   a fan energizing circuit connected to said fan means across said main circuit,
   and a second manual switch connected in series with said valve means across said main circuit to control said valve and ganged with said first manual switch,
   said refrigerant system being filled with a low pressure refrigerant,
   said thermostatic switches being actuated in response to temperature of said first heat exchanger coil.

3. A reversible air conditioning system in an automotive vehicle having a passenger chamber and a liquid cooled engine comprising,
   a first heat exchanger means including a coil having means for circulating air in said chamber over the coil,
   a second heat exchanger means including a coil arranged to have coolant liquid from said engine circulated thereover,
   a compressor,
   means including an electrically actuated clutch arranged to drivingly connect said engine to said compressor,
   means including an electrically controlled four-way valve connected to said compressor and arranged to selectively connect the output pressure side of the compressor to said second heat exchanger coil and the inlet suction side of the compressor to the first of said heat exchanger coils and alternatively oppositely connecting the compressor to said heat exchanger coils in the opposite position of the valve,
   a refrigerant receiver connected between the opposite sides of said heat exchanger coils from said valve,
   means including a pair of pressure reducing valves connected in series one on each side of said receiver and arranged to reduce the pressure of refrigerant passing from said receiver to said heat exchanger coils,
   means including oppositely opening check valves bypassing said pressure reducing valves and opening from the low pressure side to the high pressure side of the reducing valves,
   a main electrical circuit connectable to engage said clutch, said fan means and said valve control,
   a low temperature thermostatic switch and a high temperature thermostatic switch connected in series with said clutch across said circuit to control the operation of said clutch,
   a manually operative switch bridged across said low temperature thermostatic switch,
   a fan energizing circuit connected to said fan means across said main circuit,
   and a second manual switch connected in series with said valve means across said main circuit to control said valve and ganged with said first manual switch, said refrigerant system being filled with a low pressure refrigerant, said thermostatic switches being actuated in response to temperature of said first heat exchanger coil.

4. A reversible air conditioning system in an automotive vehicle having a passenger chamber and a liquid cooled engine comprising, a first heat exchanger means including a coil having means for circulating air over the coil, a second heat exchanger means including a coil arranged to have coolant liquid from said engine circulated thereover, a compressor, means including an electrically actuated clutch arranged to drivingly connect said engine to said compressor, means including an electrically controlled four-way valve connected to said compressor and arranged to selectively connect the output pressure side of the compressor to said second heat exchanger coil and the inlet suction side of the compressor to the first of said heat exchanger coils and alternatively oppositely connecting the compressor to said heat exchanger coils in the opposite position of the valve, a refrigerant receiver connected between the opposite sides of said heat exchanger coils from said valve, means including a pair of pressure reducing valves connected in series one on each side of said receiver and arranged to reduce the pressure of refrigerant passing from said receiver to said heat exchanger coils, means including oppositely opening check valves bypassing said pressure reducing valves and opening from the low pressure side to the high pressure side of the reducing valves, a main electrical circuit connectable to engage said clutch, said fan means and said valve control, a low temperature thermostatic switch and a high temperature thermostatic switch connected in series with said clutch across said circuit to control the operation of said clutch, a fan energizing circuit connected to said fan means across said main circuit, and a second manual switch connected in series with said valve means across said main circuit to control said valve, said refrigerant system being filled with a low pressure refrigerant, said thermostatic switches being actuated in response to temperature of said first heat exchanger coil.

5. A reversible air conditioning system in an automotive vehicle having a compartment to be conditioned and a liquid cooled engine comprising, a first heat exchanger means including a coil having fan means for circulating air in said compartment over the coil, a second heat exchanger means including a coil aranged to have coolant liquid from said engine circulated thereover, a compressor, means including an electrically actuated clutch arranged to drivingly connect said engine to said compressor, means including an electrically controlled four-way valve connected to said compressor and arranged to selectively connect the output pressure side of the compressor to said second heat exchanger coil and the inlet suction side of the compressor to the first of said heat exchanger coils and alternatively oppositely connecting the compressor to said heat exchanger coils in the opposite position of the valve, a refrigerant receiver connected between the opposite sides of said heat exchanger coils from said valve, means including a pair of pressure reducing valves connected in series one on each side of said receiver and arranged to reduce the pressure of refrigerant passing from said receiver to said heat exchanger coils, means including oppositely opening check valves bypassing said pressure reducing valves and opening from the low pressure side to the high pressure side of the reducing valves, a main electrical circuit connectable to engage said clutch, and energize said fan means and said valve control, a low temperature thermostatic switch and a high temperature thermostatic switch connected in series with said clutch across said circuit to control the operation of said clutch, a manually operative switch bridged across said low temperature theremostatic switch, a fan energizing circuit including said fan means and a series resistor connected across said main circuit, a second manual switch ganged with said first manual switch and bridging said resistor, and a third manual switch connected in series with said valve means across said main circuit to control said valve and ganged with said first manual switch, said refrigerant system being filled with a low pressure refrigerant, said thermostatic switches being actuated in response to temperature of said first heat exchanger coil.

6. A reversible air conditioning system in an automotive vehicle having a compartment to be conditioned and a liquid cooled engine comprising, a first heat exchanger means including a coil in said compartment, a second heat exchanger means including a coil arranged to have coolant liquid from said engine circulated thereover, a compressor, means including an electrically actuated clutch arranged to drivingly connect said engine to said compressor, means including an electrically controlled four-way valve connected to said compressor and arranged to selectively connect the output pressure side of the compressor to said second heat exchanger coil and the inlet suction side of the compressor to the first of said heat exchanger coils and alternatively oppositely connecting the compressor to said heat exchanger coils in the opposite position of the valves, means including a pair of pressure reducing valves connected in series between said coils and arranged to reduce the pressure of refrigerant passing oppositely to said heat exchanger coils, means including oppositely opening check valves bypassing said pressure reducing valves and opening from the low pressure side to the high pressure side of the reducing valves, a main electrical circuit connectable to engage said clutch, and energize said valve control, a low temperature thermostatic switch and a high temperature thermostatic switch connected in series with said clutch across said circuit to control the operation of said clutch, and a manual switch connected in series with said valve means across said main circuit to control said valve, said refrigerant system being filled with a low pressure refrigerant, said thermostatic switches being actuated in response to temperature in said compartment.

7. A reversible air conditioning system in an automotive vehicle having a compartment to be conditioned and a liquid cooled engine comprising, a first heat exchanger means including a coil having fan means for circulating air in said compartment over the coil, a second heat exchanger means including a coil arranged to have coolant liquid from said engine circulated thereover, a compressor, means including a selectively operable clutch means arranged to drivingly connect said engine to said compressor, means including a selectively operable four-way valve connected to said compressor and arranged to selectively connect the output pressure side of the compressor to said second heat exchanger coil and the inlet suction side of the compressor to the first of said heat exchanger coils and alternatively oppositely connecting the compressor to said heat exchanger coils in the opposite position of the valve, a refrigerant receiver connected between the opposite sides of said heat exchanger coils from said valve, a means including a pair of pressure reducing valves connected in series one on each side of said receiver and arranged to reduce the pressure of refrigerant passing from said receiver to said heat exchanger coils, and means including oppositely opening check valves bypassing said pressure reducing valves and opening from the low pressure side to the high pressure side of the reducing valves, said refrigerant system being filled with a low pressure refrigerant.

8. A reversible air conditioning system in an automotive vehicle having a compartment to be conditioned and a liquid cooled-engine comprising, a first heat exchanger means including a coil having fan means for circulating air in said compartment, a second heat exchanger means including a coil arranged to have coolant liquid from said engine circulated thereover, a compressor, means including a selectively operable clutch means arranged to drivingly connect said engine to said compressor, means including a selectively operable four-way valve connected to said compressor and arranged to selectively connect the output pressure side of the compressor to said second heat exchanger coil and the inlet suction side of the compressor to the first of said heat exchanger coils and alternatively oppositely connecting the compressor to said heat exchanger coils in the opposite position of the valve, means including a pair of pressure reducing valves connected in series between said coils and arranged to reduce the pressure of refrigerant passing oppositely to said heat exchanger coils, and means including oppositely opening check valves bypassing said pressure reducing valves and opening from the low pressure side to the high pressure side of the reducing valves, said refrigerant system being filled with a low pressure refrigerant.

References Cited in the file of this patent
UNITED STATES PATENTS

| | | |
|---|---|---|
| 2,263,476 | Sunday | Nov. 18, 1941 |
| 2,715,514 | Stair | Aug. 16, 1955 |
| 2,806,358 | Jacobs | Sept. 17, 1957 |